United States Patent [19]
Nicholls

[11] 3,756,734
[45] Sept. 4, 1973

[54] SOCKETS FOR BALL AND SOCKET JOINTS
[75] Inventor: Lawrence George Nicholls, Tyseley, Birmingham, England
[73] Assignee: Girling Limited, Birmingham, England
[22] Filed: Mar. 6, 1972
[21] Appl. No.: 231,893

[30] Foreign Application Priority Data
Mar. 9, 1971 Great Britain .................... 6,397/71

[52] U.S. Cl. .................................... 403/14, 403/133
[51] Int. Cl. .......................................... F16c 11/06
[58] Field of Search ...................... 287/88, 90 R, 87

[56] References Cited
UNITED STATES PATENTS
3,586,358  6/1971  Kiesow ................................. 287/88

FOREIGN PATENTS OR APPLICATIONS
198,143  6/1958  Austria .............................. 287/90 R Primary Examiner—Andrew V. Kundrat
Attorney—Samuel Scrivener, Jr., John H. O. Clarke et al.

[57] ABSTRACT

A ball socket component of moulded form has its part spherical surface formed by spaced, axial extending projections having concave, part spherical end portions arranged in two annular groups. The projections forming one row are aligned with corresponding recesses between the projections of the other row, enabling the component to be made as a one piece moulding, without the use of a collapsible core piece.

7 Claims, 3 Drawing Figures

PATENTED SEP 4 1973      3,756,734

# SOCKETS FOR BALL AND SOCKET JOINTS

This invention relates to socket components for ball and socket joints. Such components have hitherto been made from metal, by machining or from moulded materials, such as synthetic plastics. The present invention is concerned only with moulded socket components.

Because of the undercut form of the recess, it has hitherto been necessary to employ a collapsible core, that is a core tool which is capable of being retracted radially inwardly in order that it can be removed from the part spherical recess of the component. These collapsible core tools have many well known disadvantages, including their high cost and liability to breakage and wear in repeated use.

The present invention aims at the provision of a novel socket component which, by virtue of its design, is capable of production by moulding, without the use of a collapsible core tool.

Accordingly, the invention provides a socket component for a ball and socket joint, comprising an integral moulding of resilient material having a part spherical cavity open from opposite sides, the improvement which comprises two axially spaced rows of axially extending internal projections, in said cavity, and interrupted by recesses formed between said projections, which recesses are each aligned with respective corresponding projections in the other row, said projections each terminating at its inner end at a concave part spherical surface, which surfaces together define a ball seating.

Preferably, an annular recess is formed in one or each side face of the component to surround the adjacent open end of said cavity recess, whereby to increase the flexibility of said projections in radial directions. This arrangement facilitates the insertion of a ball component into the socket recess.

One form of socket component in accordance with the invention will now be described, by way of example, with reference to the accompanying drawings in which.

Figure 1:
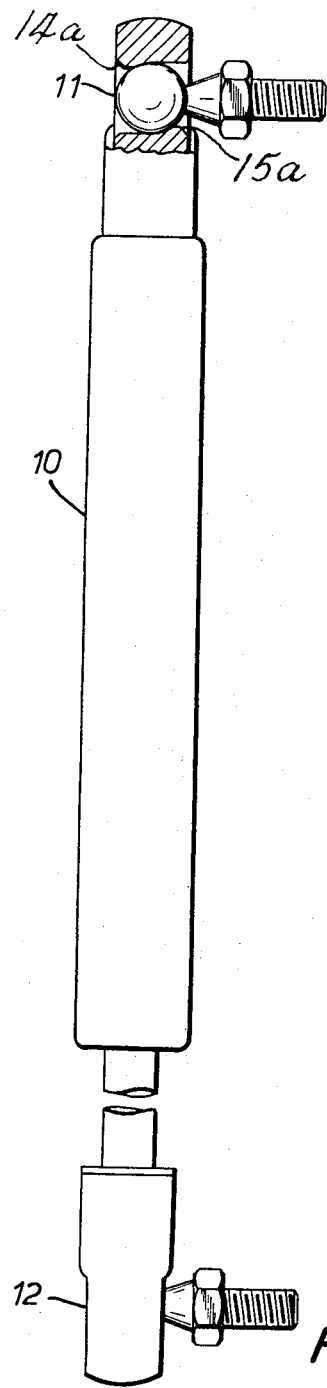
FIG. 1 shows a telescopic damper or gas spring provided at either end with a socket in accordance with the present invention.

Referring to FIG. 1 of the drawings, a telescopic damper or gas spring 10 is attached to respective vehicle components (not shown) by means of ball and socket joints 11 and 12.

Figure 2:
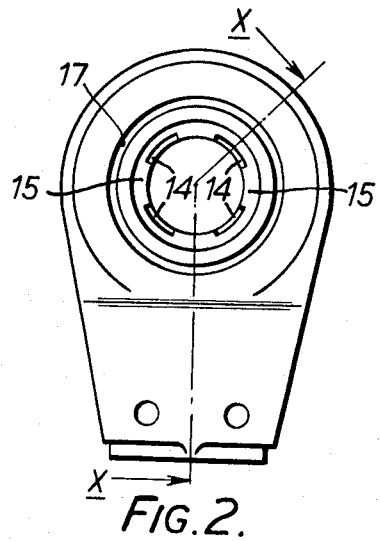
FIG. 2 shows an end view of one of the sockets.
Figure 3:
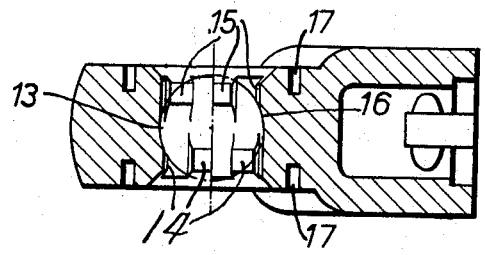
FIG. 3 shows an axial cross-section taken along the line X—X of the socket of FIG. 2.

As shown in FIGS. 2 and 3, each socket, which is conveniently made of synthetic plastics material, for example nylon or polypropylene has a generally cylindrical through bore provided internally with a female coupling portion 13 for receiving a ball. The female coupling portion 13 comprising two axially spaced circumferential rows 14 and 15 of spaced axially extending internal projections which are integrally moulded with the component. The projections of each row of projections register axially with respective recesses between the projections of the other row. The projections are formed at their inner ends with part spherical concave surfaces, as at 16, together defining a part spherical recess open from both sides, to receive the ball.

The ball is readily engaged in the socket with a snap fitting action by pressing the ball through one open side the projections 14 or 15 yielding resiliently to allow the ball to pass. Equally, the ball can be disengaged if desired in like manner. To facilitate insertion of the ball, the axially outer ends of the projections are formed with ramp surfaces 14a and 15a as shown in FIG. 1.

Preferably, and as shown, two annular recesses 17 are formed in the opposite side faces of the component each surrounding the adjacent open end of the recess, thus rendering the adjacent projections 14 or 15 more readily flexible in radial directions to facilitate insertion and removal of the ball. If desired a single recess 17 may be provided in one side only, to ease insertion of a ball from that side.

The socket may be manufactured with the assistance of a core tool in two mating parts which are axially separable, the parts having interfitting fingers which form the recesses in the component, and which have part spherical convex ends to form the corresponding part spherical surfaces of the socket.

An identical component can alternatively be manufactured by forming two separate half-mouldings, split along a plane containing the axis of the recess, the halves being integrally united, for example by high-frequency welding.

What is claimed is:

1. In a socket component for a ball and joint, comprising an integral moulding of resilient material having a part spherical cavity open from opposite sides the improvement which comprises two axially spaced rows of axially extending internal projections in said cavity and interrupted by recesses formed between said projections, which recesses are each aligned with respective corresponding projections in the other row, said projections each terminating at its inner end at a concave part spherical surface, which surfaces together define a ball seating, and an annular recess formed in at least one side face of the component to surround the adjacent open end of said cavity so as to increase the flexibility of said projections in radial directions.

2. The improved socket component according to claim 1, wherein the component is made of synthetic plastics material selected from the group consisting of nylon and polypropylene.

3. A socket component as claimed in claim 1, wherein said projections have axially outer ends formed with ramp surfaces to facilitate insertion of a ball component past said ends.

4. A socket component for a ball and socket joint, comprising an integral moulding of resilient material having a ball receiving cavity open from opposite sides, two rows of axially extending projections in said cavity and interrupted by recesses formed between said projections, which recesses are each aligned with respective corresponding projections in the other row, said projections each terminating at their axially inner ends with an inwardly facing abutment surface, said surfaces together defining a ball seating, and wherein an annular recess is formed in at least one side face of the component to surround the adjacent open end of said cavity whereby to increase the flexibility of said projections in radial directions.

5. A socket component as claimed in claim 4, wherein said projections have axially outer ends formed with ramp surfaces to facilitate insertion of a ball component past said ends.

6. A socket component for a ball and socket joint, comprising an integral moulding of resilient material having a ball receiving cavity open from opposite sides, two rows of axially extending projections in said cavity and interrupted by recesses formed between said projections, which recesses are each aligned with respective corresponding projections in the other row, said projections each terminating at their axially inner ends with an inwardly facing abutment surface, said surfaces together defining a ball seating, recess means in at least one side face of said component disposed in an annular path concentric with said cavity and arranged to render said projections adjacent said one side face more flexible in radial directions, and wherein said projections are each provided at their axially outer ends, adjacent said one side face, with ramp surfaces to facilitate insertion of a ball member through said axially outer end.

7. A socket component for a ball and socket joint, comprising an integral moulding of resilient material having a ball receiving cavity open from both sides of said moulding and a plurality of similarly shaped and dimensional projections projecting radially inwardly of said cavity, each having one inner end formed with an inwardly facing ball engaging surface and an opposite, outer end formed with a ball inserting ramp surface, said projections being arranged side-by-side in two axially spaced circumferential rows within said cavity each projection having its said outer end surface positioned adjacent one side face of said component, and its ball engaging surface positioned within said cavity, with at least some projections of one row being axially misaligned with the projections of the other row.

* * * * *